United States Patent [19]

Brady et al.

[11] 3,979,352

[45] Sept. 7, 1976

[54] AQUEOUS BASE-SOLUBLE RESIN COMPOSITIONS

[75] Inventors: John W. Brady, Grand Island; Franklin D. Strickland, Buffalo; Chester C. Longwith, Tonawanda, all of N.Y.

[73] Assignee: Shanco Plastics & Chemicals Inc., Tonawanda, N.Y.

[22] Filed: July 30, 1973

[21] Appl. No.: 384,033

[52] U.S. Cl. ............................ 260/33.4 R; 106/8; 260/23 AR; 260/29.6 H; 260/29.6 RW; 260/29.6 TA; 526/210; 526/227; 526/260; 526/263; 526/326; 526/329
[51] Int. Cl.$^2$ .................. C08K 5/05; C08F 220/06
[58] Field of Search ................ 260/80.8, 80.3 R; 260/33.4 R

[56] References Cited
UNITED STATES PATENTS

| | | |
|---|---|---|
| 3,308,078 | 3/1967 | Rogers et al. .................. 260/27 |
| 3,705,864 | 12/1972 | Stieger et al. .................. 260/22 R |
| 3,753,958 | 8/1973 | Wingler et al. ................ 260/78.5 R |

FOREIGN PATENTS OR APPLICATIONS 1,107,249   3/1968   United Kingdom

*Primary Examiner*—Stanford M. Levin
*Attorney, Agent, or Firm*—Raymond F. Kramer

[57] ABSTRACT

Polymerization products of carboxyl-free and carboxylsubstituted ethylenically unsaturated monomers have retained with the resin a reaction solvent mixture of high boiling alcohols, of which about 30 to 60% are normally liquid, waterinsoluble alcohols. These products are solid, hard glass-like resins which may be dissolved in aqueous bases to form clear or cloudy substantially colorless coating solutions useful in the preparation of clear or cloudy aqueous floor polishes which deposit clear protective films on treated floors.

9 Claims, No Drawings

AQEOUS BASE-SOLUBLE RESIN COMPOSITIONS

This invention relates to resins which are soluble in aqueous bases. More particularly, it relates to low molecular weight aqueous base-soluble resins, resin cuts and resin compositions and novel water-based floor polish compositions prepared therefrom.

It is known to prepare resins which are soluble in aqueous bases. Among such resins are polymers of relatively low molecular weight, e.g., below about 5,000, which contain units of at least two monomers which have relative reactivity ratios at 80°C. of less than about 1, including at least one carboxylfree, polymerizable, ethylenically unsaturated monomer and at least one carboxyl-containing polymerizable ethylenically unsaturated monomer. The resultant polymers, when admixed with an aqueous base such as aqueous ammonia, form a substantially clear resin solution of a pH greater than about 7, e.g., 7 to 12. Resins such as these generally lower the surface tension of water in which they are dissolved and act as leveling agents. They are especially useful as components of water-based or aqueous floor polish compositions wherein they assist in the formation of uniform, continuous coherent films on application of the polish and form an important part of the resulting film or finish on drying of the polish. The prior art resins utilized include styrene-maleic anhydride and rosin maleate resins and the former have been prepared by base radical-initiated solution or emulsion polymerization techniques, employing as chain transfer or chainterminating solvents high boiling alcohols, such as ethylene glycol monobutyl ether and methyl isobutyl carbinol, both of which have appreciable solubilities in water. The prior art has prescribed the removal of such solvents from the polymerization product since attempted dissolving of the alcohol-containing product in aqueous base to form a resin solution results in milky, heterogeneous products rather than such which are desirably clear (see British Pat. No. 1,107,249 and U.S. Pat. application Ser. No. 467,121, of L. A. Kaminski, entitled "Resins", which is cited in U.S. Pat. No. 3,308,078, of J. R. Rogers et al.). The prescribed removal of the high boiling reaction solvent involves costly and often troublesome concentration and azeotropic distillation operations and may entail vacuum stripping of the solvent which, in addition to being time-consuming, can promote degradation of the resin due to lengthy exposure of the resin to elevated temperatures.

The aforementioned disadvantages of the prior art are overcome by the present invention which provides an aqueous base-soluble solid resin having an acid number of about 60 to 250, preferably 120 to 185, and an average molecular weight of about 600 to 4,000, preferably 800 to 2,000. The molecular weights referred to are number average molecular weights and are for a resin containing about 10% of a solvent, as described in (C) below. This resin is the polymerization product of a mixture comprising:

A. about 20 to 70 mole percent, preferably 45 to 65 percent of at least on carboxyl-free, polymerizable, ethylenically unsaturated monomer, B. about 15 to 60 mole percent, preferably 20 to 40 mole percent of at least one carboxyl-substituted, polymerizable, ethylenically unsaturated monomer, C. as solvent, a mixture of alcohols of normal boiling points above about 175°C., which mixture contains about 30 to 60 weight percent of water insoluble alcohol(s) and about 40 to 70 weight percent of water soluble alcohol(s), the mole percentage of the solvent alcohols being about 10 to 20, and D. about 0.3 to 1.0 mole percent of an organic, free radical-generating polymerization initiator.

The invention also includes resin solutions or preparations made from such a resin or obtained when it is prepared, and aqueous floor polish compositions containing such a resin. The milliequivalents of carboxyl groups per gram of resin range from 1.2 to 4, preferably 2.1 to 3.3.

It was surprising to discover that the novel resins of the invention, which retain alcoholic polymerization solvent including a substantial proportion of water insoluble alcohol, were hard glass-like solids which, when pulverized and solubilized with aqueous base, provide homogeneous, clear, substantially colorless resin solutions which are used very successfully in non-yellowing, clear floor polish compositions.

The resins of the invention are conveniently prepared by mixing the alcohols together, advantageously initially at ambient temperature, in a conventional resin kettle, desirably equipped with agitation means, after which the mixture is heated to about 150°–200°C. The monomers are admixed with the initiator and are charged gradually, usually over a period of about 0.5 to 1.5 hours, to the hot, agitated solvent mixture. On completion of the addition the reaction mass is heated to a maximum temperature up to 250°C., desirably of about 177° to 220°C. and more advantageously, at about 205°C., and is maintained at this temperature for about 10 to 30 minutes. The reaction mass is then discharged from the kettle and is allowed to cool to room temperature to obtain the solid resin product. Alternatively, the resin solution may be made by a continuous process in which the solvent, monomers and catalyst are continuously premixed and flowed through a heated tube to cause the reaction, after which the resin is solidified by cooling.

The alcohol-containing resin products of the invention are converted to clear homogeneous aqueous resin solutions by grinding or pulverizing the resin according to conventional procedures and agitating the finely ground resin in water with aqueous base, conveniently at a moderately elevated temperature, e.g., at about 60° to 70°C. for about 5 to 10 minutes. The resultant resin preparation is then allowed to cool to room temperature. The amount of aqueous base required to neutralize the carboxyl groups of the resin and thereby effect solubilization of the resin is readily calculated from the acid number of the resin which, in accord with conventional practice, is determined by neutralization with potassium hydroxide in acetone. The pH of the resin solution of the invention is greater than about 7, usually being between about 8 and 12 and most frequently is between about 9 and 10. While the concentration of resin solution (or an emulsion) can range from about 1% or less than about 25% or more, the preferred concentration is between about 10 and 20% and more preferably is between about 15 and 18%. If desired, deionized water can be used in preparing the solution and often it is preferred.

The carboxyl-free monomer or monomers used in preparing the resins of the invention are not in themselves novel and are described in the prior art, so need not be recited at length here. They are ethylenically unsaturated monomers, including styrene, acrylates, methacrylates, N-vinyl pyrrolidone, acrylonitrile, fumarate esters, such as diethyl and dimethyl fumarate and itaconate esters, such as dimethyl itaconate and mixtures thereof. Preferably, the carboxyl-free monomer or monomers used correspond(s) to the structural formula $$CH_2 = CR - Z, \qquad (I)$$

wherein R represents hydrogen or a methyl group and Z represents a carboalkoxy group (wherein the alkoxy group contains a straight or branched chain alkyl group of 1 to 12 carbons) or represents an aryl radical selected from the group consisting of phenyl and lower alkyl-substituted phenyl (wherein the term lower alkyl signifies a straight or branched chain alkyl group of 1 to 4 carbon atoms) with the proviso that when Z is aryl, R is always hydrogen. Typical preferred carboxyl-free monomers include the aforementioned styrene and methyl methacrylate, as well as n-butyl acrylate, ethyl acrylate, methyl acrylate, n-propyl acrylate, isobutyl acrylate, p-ethyl sytrene, o-vinyl toluene, m-vinyl toluene, isobutyl acrylate, lauryl acrylate, ethyl methacrylate, n-propyl methacrylate, isobutyl methacrylate and 2-ethylhexyl methacrylate. In accord with an especially preferred embodiment of the invention there is present as the carboxyl-free monomer a mixture of compounds corresponding to Formula I above, with Z being aryl in one of said compounds and in the remaining compounds being carbo-lower alkoxy, with the alkoxy being of 1 to 4 carbon atoms. Still more preferably, there is present as the carboxyl-free monomer a mixture of styrene and a lower alkyl acrylate or methacrylate in a molar ratio of about 1.6:1 to 3:1.

The carboxyl-substituted ethylenically unsaturated monomers utilized in preparing aqueous base soluble resins according to the invention may be of the structural formula $$CH_2 = CR^2COOH \qquad (II)$$

wherein $R^2$ represents hydrogen or a methyl group, i.e., the best carboxyl-substituted monomers are selected from the group consisting of acrylic acid and methacrylic acid. Preferably the molar ratio of carboxyl-free monomers to carboxy-substituted monomers is in the range of about 1.2:1 to 2.7:1.

Usually no more than four different ethylenically unsaturated monomers of both the carboxyl-free and carboxylsubstituted types combined are employed in preparing the resins of the invention.

The initiator for the polymerization reaction is an organic compound which generates free radicals on heating. Examples of such initiators which are conventional in the art of polymerization of ethylenically unsaturated compounds include aroyl peroxides such as benzoyl peroxide, p-tolyloyl peroxide, p-methoxy benzoyl peroxide, lower alkyl esters of aliphatic or aromatic carboxylic peracids, such as t-butyl peroctoate or t-butyl perbenzoate and azo-bis-isobutyronitrile. Preferred initiators of the invention are aroyl peroxides and the lower alkyl esters of aromatic or aliphatic carboxylic peracids. An especially good result is generally obtained employing benzoyl peroxide as the initiator. Preferably about 0.3 to 0.9 mole percent initiator is charged to the polymerization vessel or a component of the reaction mixture.

The alcohols employed as polymerization solvents in the present invention should have normal boiling points, i.e., boiling points at atmospheric pressure, above the maximum temperature stage of the polymerization, i.e., above at least about 175°C., e.g., above 177°C., to avoid boiling of the solvent during the polymerization reaction. In some cases alcohols boiling at less than 175°C. may be used but such reactions will be under pressure to maintain the alcohol liquid and pressure reactions ae not as desirable. Preferably the alcohols employed have such boiling points above about 205°C. Usually the alcohols employed in the invention have a normal boiling point below 300°C. The alcohols contemplated by the invention are aliphatic mono- and polyhydric straight and branched chain alcohols wherein the aliphatic chains may be interrupted by one or more ether, i.e., —O—, linkages. Preferably the alcohols are monohydric alcohols, diols or triols. Both the water soluble and water insoluble alcohols contemplated by the invention are desirably saturated. At ambient temperature, i.e., 25°C., the water insoluble alcohol or alcohols employed in the solvent should have no appreciable water solubility and should be liquids. Typical examples of suitable water-insoluble alcohols include: 2-ethyl hexanol; b.p. 183.5°C.; n-nonyl alcohol, b.p. 215°C.; n-decyl alcohol, b.p. 239.9°C.; n-dodecyl alcohol, b.p. 259°C.; 2,6,8-trimethyl-nonyl-4-alcohol, b.p. 225.2°C. and isodecanol (mixed isomers corresponding to the formula $C_{10}H_{21}OH$), b.p. 220°C.; as well as mixtures of those of equivalent alcohols of 8 to 12 carbon atoms.

Preferably the water insoluble alcohol or alcohols charged in accordance with the invention is a primary monohydric aliphatic alcohol of 9 to 12 carbon atoms. n-Decyl alcohol is most preferred, or mixtures thereof with other such higher alcohols.

Representative examples of suitable water soluble alcohols include diethylene glycol monobutyl ether, b.p. 230.6°C.; glycerol, b.p. 290°C.; diethylene glycol monoethyl ether, b.p. 195°–202°C., ethylene glycol, b.p. 197.2°C.; ethylene glycol monohexyl ether, b.p. 208.1°C.; diethylene glycol monomethyl ether, b.p. 194°C.; 1,3-propane diol, b.p. 210°–211°C.; 1,4-butylene glycol, b.p. 230°C.; 2,3-butylene glycol, b.p. 179°–182°C.; 1,3-butylene glycol, b.p. 207.5°C.; diethylene glycol, b.p. 245°C.; 2,2,4-trimethyl-1,3-pentane diol, b.p. 215°–235°C.; and triethylene glycol, b.p. 287.4°C.; as well as mixtures of these and equivalent alcohols. Preferably, a diol is employed as the water soluble alcohol and 2,2,4-trimethyl 1,3-pentane diol is especially preferred, but others of 4 to 8 carbon atoms are also useful.

In a preferred embodiment of the invention the alcoholic solvent contains about 40 to 55 weight percent of water insoluble alcohol or alcohols and about 45 to 60 weight percent of water soluble alcohol or alcohols. An especially good result is obtained employing as solvent a mixture containing about 50 weight percent of a water insoluble alcohol and about 50 weight percent of a water soluble alcohol.

The aqueous bases employed in preparing the aqueous resin cuts or solutions of the invention are those employed conventionally in the art. Most commercially available aqueous bases can be used. Thus, aqueous solutions containing ammonium hydroxide, aqueous ammonia, sodium hydroxide, potassium hydroxide, borax, water soluble organic amines, such as lower alkyl amines, etc., may be employed. Typical suitable amines are those wherein the alkyls are of 1 to 4 carbon atoms, such as methyl amine, ethyl amine, dimethyl amine, diethyl amine, isobutyl amine, n-propyl amine, isopropyl amine, trimethyl amine, triisopropyl amine and mixtures thereof. Preferably, aqueous ammonia of a concentration from 5 to 28% in water is utilized as the aqueous base in preparing the resin solutions.

The alcohol-containing resins and resin solutions or cuts of the invention are substantially colorless, only occasionally containing a slight tint of yellow. The resin solutions are relatively viscous liquids having viscosities in the range of about 15 to 200 centipoises, as measured at ambient temperature, e.g., 25°C.

The aqueous resin solutions of the invention contribute an exceptional degree of leveling when incorporated in a floor polish composition. The floor polish compositions of the invention are of the water-based type and can be described as comprising an aqueous medium containing a resin solution such as was described above, present in sufficient amount to provide about 1 to 3 weight percent, preferably 1.4 to 2.9 weight percent of dissolved resin; a metallized acrylic and/or methacrylic polymer or copolymer emulsion or solution in sufficient amount to provide a concentration of about 7 to 12 weight percent, preferably 10 to 11.5 weight percent of the polymer; and about 0 or 1 to 5 weight percent of adjuvants selected from the group consisting of plasticizers, surfactants, anti-foaming agents, organic solvents, and/or organic bases.

The floor polish composition of the invention preferably also contains an emulsion of a natural wax such as carnauba wax and/or the various proprietary polyethylene wax compositions, as shown in Example 14, 15, 16, 19 and 20. The wax emulsion is charged in an amount sufficient to provide 1 to 7% wax based on the weight of the polish.

The metallized acrylic polymers charged to the polish compositions are conventional proprietary organic film formers containing a heavy metal such as zinc, zirconium, cadmium, copper or nickel crosslinked in and/or complexed with an acrylic polymer. The metallized polymers are available in the form of aqueous emulsions or solutions.

The floor polish compositions of the invention can be prepared in the form of clear liquids by employing a solution of a suitable metallized acrylic and/or methacrylic polymer or copolymer and by omitting the addition of wax emulsion, as illustrated in Example 13. Other useful metallized acrylic copolymers include Rhoplex B832; Ubatol DW-3036 and DW-855 (Staley Chemical Division of A. E. Staley Mfg. Co.); NH-425 Latex (Morton Chemical Company, a division of Morton-Norwich Products, Inc.); and Richamer R-747 (Organic Chemicals Division of the Richardson Company).

The adjuvants may include, for example, a trialkyl phosphate plasticizer, such as tributoxy ethyl phosphate; surfactants, such as an octylphenyl polyethoxy ethanol; organic amine bases such as morpholine; organic solvents such as alcohols (in addition to alcohols provided in the resin solution, e.g., diethylene glycol monoethyl ether; and antifoaming agents such as the proprietary silicone compositions, one of which is shown in Example 20.

The constituents of the polish are blended together in accord with mixing techniques that are known in the floor polish formulation art. As will be apparent from Examples 13-16 and 18-20, variations in the proprietary wax and metallized acrylic polymer can be made to enhance particularly desired characteristics in the polish, for example, resistance to water spotting or susceptibility of the applied polish to buffing to remove the effects of heavy traffic.

The novel resin cuts of the invention, when incorporated into the present floor polish formulation, provide an exceptional degree of gloss. Moreover the floor polishes prepared from the substantially color-free resin cuts of the invention provide floor finishes of particularly good resistances to yellowing, even on long term exposure to air and even with multiple applications of the polish.

In the following examples, which serve to illustrate but not to limit the invention, parts and percentages are by weight and temperatures are in °C. unless otherwise noted.

EXAMPLE 1

Part A

|  | Parts | Mole % of Mixture |
|---|---|---|
| Decyl alcohol | 75 | 7.89 |
| 2,2,4-Trimethyl-1,3-pentane diol | 75 | 8.55 |
| Methacrylic acid | 172 | 33.3 |
| Methyl methacrylate | 100 | 16.6 |
| Styrene | 208 | 33.3 |
| Benzoyl peroxide | 4.8 | 0.33 |

The decyl alcohol and the diol are mixed together in a resin kettle and the resulting liquid solvent mixture is heated to about 149°C. Over a period of about 90 minutes a mixture of the methacrylic acid, methyl methacrylate, styrene and benzoyl peroxide is charged to the agitated solvent, which is maintained at about 149°C. On completion of the addition, the polymerization mix is heated to about 205°C. and is maintained at the latter temperature for 15 minutes. The reaction mass is discharged from the kettle and allowed to cool to ambient temperature. The product is a hard, clear, glass-like solid having a ring and ball melting point of 138.5° and an acid number, determined with potassium hydroxide in acetone, of 162.3. The number of milliequivalents of carboxyl groups per gram of resin is 2.893.

Part B

The alcohol-containing product is ground to a particle size sufficiently fine to pass through a 10 mesh screen (U.S. Sieve Series). To the resultant powdered product, which is agitated at ambient temperature in 81 parts of water, there are added 4 parts of 28% aqeous ammonia. The agitated mixture is heated to 66°C. and maintained at that mixing temperature for about 10 minutes. The resultant aqueous product, containing about 15% dissolved Part A product, is a clear colorles viscous liquid having a pH of about 9.2.

In Examples 2 to 12 procedures essentially the same as that of Example 1, Part A are employed to prepare hard glass-like resins similar to the Example 1, Part A product. By procedures like that of Example 1, Part B, the product resins are ground and dissolved in aqueous ammonia to form clear, substantially colorless solutions having viscosities in the range of 15–200 centipoises at 25°C.

EXAMPLE 2

| | Parts | Mole % of Mixture |
|---|---|---|
| 2,2,4-Trimethyl-1,3-pentane diol | 50 | 5.54 |
| Decyl alcohol | 50 | 5.12 |
| Diethylene glycol | 50 | 7.63 |
| Methacrylic acid | 172 | 32.4 |
| Methyl methacrylate | 100 | 16.2 |
| Styrene | 208 | 32.4 |
| Benzoyl peroxide | 9.6 | 0.64 |

The ring and ball melting point of the polymerized product is about 116°C. The acid number and number of milliequivalents of carboxyl group per gram of resin are respectively 160.7 and 2.864.

EXAMPLE 3

| | Parts | Mole % of Mixture |
|---|---|---|
| Diethylene glycol monobutyl ether | 85 | 8.6 |
| Decyl alcohol | 85 | 8.8 |
| Methacrylic acid | 172 | 32.8 |
| Methyl methacrylate | 100 | 16.4 |
| Styrene | 208 | 32.8 |
| Benzoyl peroxide | 4.8 | 0.65 |

EXAMPLE 4

| | Parts | Mole % of Mixture |
|---|---|---|
| 2,2,4-Trimethyl-1,3-pentane diol | 85 | 8.72 |
| Decyl alcohol | 85 | 8.07 |
| Methacrylic acid | 215 | 37.5 |
| Methyl methacrylate | 100 | 15.0 |
| Styrene | 208 | 30.0 |
| Benzoyl peroxide | 10.5 | 0.65 |

EXAMPLE 5

| | Parts | Mole % of Mixture |
|---|---|---|
| 2,2,4-Trimethyl-1,3-pentane diol | 75 | 7.86 |
| Decyl alcohol | 75 | 7.24 |
| Methacrylic acid | 172 | 30.6 |
| Methyl methacrylate | 100 | 15.3 |
| Styrene | 260 | 38.2 |
| Benzoyl peroxide | 10.6 | 0.66 |

The ring and ball melting point of the clear, hard glass-like polymerization product is 125°C.

EXAMPLE 6

| | Parts | Mole % of Mixture |
|---|---|---|
| 2,2,4-Trimethyl-1,3-pentane diol | 75 | 9.29 |
| Decyl alcohol | 75 | 8.57 |
| Methacrylic acid | 129 | 27.2 |
| Methyl methacrylate | 100 | 18.1 |
| Styrene | 208 | 36.2 |
| Benzoyl peroxide | 8.7 | 0.65 |

EXAMPLE 7

| | Parts | Mole % of Mixture |
|---|---|---|
| 2,2,4-Trimethyl-1,3-pentane diol | 75 | 7.28 |
| Decyl alcohol | 75 | 6.72 |
| Methacrylic acid | 172 | 28.4 |
| Methyl methacrylate | 100 | 14.2 |
| Styrene | 312 | 42.6 |
| Benzoyl peroxide | 14.6 | 0.86 |

EXAMPLE 8

| | Parts | Mole % of Mixture |
|---|---|---|
| Decyl alcohol | 75 | 7.15 |
| Diethylene glycol monobutyl ether | 75 | 7.16 |
| Methacrylic acid | 129 | 23.1 |
| Methyl methacrylate | 150 | 23.1 |
| Styrene | 260 | 38.6 |
| Benzoyl peroxide | 10.8 | 0.69 |

EXAMPLE 9

| | Parts | Mole % of Mixture |
|---|---|---|
| Decyl alcohol | 50 | 5.38 |
| Diethylene glycol monobutyl ether | 50 | 5.27 |
| Methacrylic acid | 129 | 25.7 |
| Styrene | 260 | 42.8 |
| n-Butyl acrylate | 150 | 20.0 |
| Benzoyl peroxide | 10.6 | 0.75 |

EXAMPLE 10

| | Parts | Mole % of Mixture |
|---|---|---|
| Decyl alcohol | 50 | 5.12 |
| Diethylene glycol monobutyl ether | 50 | 4.99 |
| Methacrylic acid | 129 | 24.3 |
| Styrene | 260 | 40.5 |
| Ethyl acrylate | 150 | 24.3 |
| Benzoyl peroxide | 10.8 | 0.72 |

EXAMPLE 11

| | Parts | Mole % of Mixture |
|---|---|---|
| Decyl alcohol | 50 | 5.41 |
| Diethylene glycol monobutyl ether | 50 | 5.27 |
| Methacrylic acid | 148.5 | 29.6 |
| Methyl methacrylate | 345.4 | 59.1 |
| Benzoyl peroxide | 10.0 | 0.71 |

EXAMPLE 12

| | Parts | Mole % of Mixture |
|---|---|---|
| Decyl alcohol | 83 | 7.4 |
| Diethylene glycol monobutyl ether | 83 | 7.23 |
| Methacrylic acid | 172 | 28.2 |
| Styrene | 416 | 56.5 |
| Benzoyl peroxide | 11.7 | 0.68 |

Examples 13–16 illustrate the preparation of floor polish compositions using as the resin cut the 15% aqueous resin solution of Example 1, Part B.

EXAMPLE 13

| | Parts |
|---|---|
| Resin cut of Example 1, Part B | 20.0 |
| 40% Base-soluble zinc-crosslinked aqueous acrylic copolymer solution (Rhoplex B-505, manufactured by Rohm and Haas Co.) diluted to 15% concentration by addition | 80.0 |

| | Parts |
|---|---|
| of water | |
| Dipropylene glycol monomethyl ether (Ucar 2 LM, manufactured by Union Carbide Corp.) | 2.0 |
| Diethylene glycol monomethyl ether | 1.0 |
| Tributoxyethyl phosphate | 1.0 |
| 1% Aqueous fluorocarbon surfactant (FC-128, manufactured by 3M Company) | 0.5 |

The constituents are added to the agitated resin cut in the order given above at ambient temperature. The pH of the resultant mixture is adjusted to 9.1 by addition of ammonia and the resultant mass is agitated for 30 minutes. On readjustment of the pH of the mass to 9.1 by further addition of ammonia there is obtained a clear, substantially colorless floor polish composition which forms a tough, glossy film when applied to floors. The applied polish is also characterized by excellent resistance to yellowing even after application in multiple coats and after long term exposure to air.

EXAMPLE 14

| | Parts |
|---|---|
| Resin cut of Example 1, Part B | 10.0 |
| 38% Aqueous metal-crosslinked alkali soluble acrylic polymer emulsion (Richamer R-747, manufactured by Richardson Co.) diluted to 15% by addition of water | 80.0 |
| *15% Aqueous anionic synthetic organic wax emulsion | 10.0 |
| Tributoxyethyl phosphate | 1.0 |
| 1% Aqueous fluorocarbon surfactant (FC-128, manufactured by 3M Corp.) | 0.5 |
| 37% Aqueous formaldehyde (formalin) | 0.15 |

*The wax emulsion is obtained by heating 84.0 parts of an ethylene-organic acid copolymer wax (A-C Copolymer, manufactured by Allied Chemical Corp.) and 14.0 parts of a refined tall oil fatty acid (Acintol FA-3, manufactured by the Arizona Chemical Co.) to 127°C. To the resultant wax melt there is added a solution obtained by gentle warming of 1.7 parts of potassium hydroxide flakes in 3.4 parts of ethylene glycol. After the resultant waxhydroxide mixture has been agitated for 5 minutes at 125°C. there are added 14.0 parts of morpholine and the resulting mass is agitated further for 5 minutes at 125°C. The hot wax melt is then gradually charged to water agitated at about 95°–99°C. On completion of the addition the mass is cooled rapidly to ambient temperature.

The resin cut is charged to the aqueous metal crosslinked polymer with thorough agitation. On completion of the addition, the aqueous wax emulsion is added to the resulting mixture with agitation. The ether, phosphate, surfactant and formaldehyde are mixed with agitation and charged to the mixture of resin cut, metal crosslinked polymer and wax emulsion. The resultant mass is agitated for thirty minutes to produce the floor polish. This product, on application to floors, produces tough, bright, glossy films of very light color (essentially colorless) and of excellent resistance to water spotting, yet it is easily removable with ammonia.

EXAMPLE 15

| | Parts |
|---|---|
| Resin cut of Example 1, Part B | 10.0 |
| 40% Aqueous metal crosslinked acrylic polymer emulsion (Neocryl SR-270, manufactured by Polyvinyl Chemical Industries), diluted to 15% by addition of water | 70.0 |
| 40% Aqueous nonionic polyethylene wax emulsion (Poly-Em 40, manufactured by Cosden Oil and Chemical Co.), diluted to 15% by addition of water | 20.0 |
| Diethylene glycol monoethyl ether | 2.5 |
| Tributoxyethyl phosphate | 1.0 |
| 1% Aqueous fluorocarbon surfactant (FC-170, manufactured by 3M Co.) | 0.5 |

The resin cut is charged to the polymer emulsion with agitation. The wax emulsion, glycol ether, phosphate and surfactant are admixed and blended with agitation into the resultant mixture of resin cut and polymer emulsion. The mass is then agitated at ambient temperature for 30 minutes. The floor polish resulting produces a bright, glossy finish which is especially resistant to heavy traffic, is non-yellowing and is readily removable when desired.

EXAMPLE 16

| | Parts |
|---|---|
| Resin cut of Example 1, Part B | 10.0 |
| 40% Aqueous metal crosslinked acrylic polymer emulsion (NH-425 Latex, manufactured by Morton Chemical Co.), diluted to 15% by addition of water | 80.0 |
| 15% Aqueous anionic synthetic organic wax emulsion of Example 14 | 10.0 |
| Diethylene glycol monoethyl ether | 2.5 |
| Tributoxyethyl phosphate | 1.0 |
| Octyl phenyl polyethoxy ethanol nonionic emulsifier containing 40 ethylene oxide residues per octyl phenyl moiety (Triton X-405, manufactured by Rohm and Haas Company) | 0.5 |
| 1% Aqueous fluorocarbon surfactant (FC-128, manufactured by 3M Company) | 0.5 |

The resin cut is blended, with agitation, into the polymer emulsion and the wax emulsion is charged. The remaining constituents are admixed and blended with agitation into the mixture of resin cut and polymer emulsion. After the resultant mass has been agitated for 30 minutes, the pH of the mixture is adjusted by addition of aqueous ammonia to 8.0 to 8.3. There is obtained a floor polish composition which provides a high gloss floor finish characterized by excellent traffic resistance, water spotting resistance, and recoatability.

Examples 17–18 illustrate the preparation of aqueous resin cuts containing concentrations of polymerized product greater than that of Example 1, Part B product.

EXAMPLE 17

The procedure of Example 1, Part B is repeated substantially as described except that the amount of water charged to the ground alcoholic solvent-containing resin is 71.5 parts. There is obtained a 17% clear, substantially colorless, aqueous solution of the resin.

EXAMPLE 18

The procedure of Example 1, Part B is repeated substantially as described except that the amount of water charged to the ground alcoholic solvent-containing resin is 67.5 parts. There is obtained an 18% clear, substantially colorless, aqueous solution of the resin.

Examples 19-20 illustrate the preparation of floor polish compositions containing, as aqueous resin cuts, the products of Examples 17 and 18, respectively.

EXAMPLE 19

| | Parts |
|---|---|
| 38% Aqueous metal complexed acrylic copolymer emulsion (DW-855, manufactured by Staley Chemical Company), diluted to 17% by addition of water | 25.0 |
| 38% Aqueous metal complexed all acrylic copolymer emulsion (Ubatol DW-3036, manufactured by Staley Chemical Company), diluted to 17% by addition of water | 40.0 |
| Resin cut of Example 17 | 12.5 |
| *17% Aqueous anionic synthetic organic wax emulsion | 22.5 |
| Diethylene glycol monoethyl ether | 2.0 |
| Tributoxyethyl phosphate | 1.0 |
| N-methyl-2-pyrrolidone | 0.5 |
| 1% Aqueous fluorocarbon surfactant (FC-128, manufactured by 3M Company) | 0.5 |

*The wax emulsion is obtained by heating a mixture of 30.0 parts of a high viscosity emulsifiable polyethylene wax (Epolene E-10, manufactured by Eastman Chemical Products, Inc.), 10.0 parts of a low melt viscosity, low molecular weight emulsifiable polyethylene wax (Epolene E-14, manufactured by Eastman Chemical Products Inc.) and 7.0 parts of a refined tall oil fatty acid (Acintol FA-3, manufactured by Arizona Chemical Company) to 125°C., agitating the mixture and adding thereto 7.0 parts of morpholine. The resultant mass is agitated for five minutes at 125°C. and charged slowly to water agitated at 95°-99°C. The resultant mixture is then rapidly cooled to room temperature.

The constituents are blended together in the order listed above, employing good agitation. The resultant mixture is agitated for 30 minutes to yield a floor polish composition which, on application, dries to a clear, bright, tough finish, which shows excellent resistance to water spotting and which can be buffed to a shine to remove the effects of heavy traffic.

EXAMPLE 20

| | Parts |
|---|---|
| Resin cut of Example 18 | 15.0 |
| 40% Aqueous modified acrylic metal crosslinked polymer emulsion (Rhoplex B-832, manufactured by Rohm and Haas Company), diluted to 18% by addition of water | 45.0 |
| 41% Aqueous anionic polyethylene wax emulsion (Poly-Em 20, manufactured by Cosden Oil and Chemical Company), diluted to 18% by addition of water | 40.0 |
| Diethylene glycol ethyl ether | 3.0 |
| Tributoxyethyl phosphate | 1.0 |
| 1% Aqueous fluorocarbon surfactant (FC-128, manufactured by 3M Company) | 0.5 |
| 1% Aqueous silicone antifoaming agent emulsion (SWS-211, manufactured by Stauffer-Wacker Silicone Corporation) | 0.2 |
| 37% Aqueous formaldehyde (formalin) | 0.15 |

The aqueous resin cut and polymer emulsion are mixed and the resultant mixture is added the wax emulsion. The remaining constituents are admixed and charged, with agitation, to the waxresin cut-polymer mixture. After agitation of the resultant mixture for 30 minutes there is obtained a floor polish composition which produces on a floor, a clear finish, which buffs to a very deep, high gloss and which resists water-spotting.

The attractive clear resins of this invention, containing the water insoluble alcohol, which nevertheless gives clear polishes, are also made by processes which are modifications of the working examples previously given. With respect to Examples 1-12, in each example the diol or ether may be replaced with 1,3-propane diol; 1,4-butylene glycol; diethylene glycol; 2,2,4-trimethyl-1,3-pentane diol; and triethylene glycol; without adversely affecting resin properties. Similarly, although n-decyl alcohol is the preferred intermediate or higher primary monohydric aliphatic alcohol, other water insoluble alcohols may also be utilized, alone or in mixture, including 2-ethyl hexanol; n-nonyl alcohol; n-dodecyl alcohol; isodecanol; and 2,6,8-trimethylnonyl-4-alcohol; without adverse effects. Similarly, when the proportions of the water soluble and water insoluble alcohols and of different types of water insoluble alcohols are varied within the ranges given in the specification, useful products result. In fact, although it is highly desirable to utilize the water soluble alcohols too, in some instances the compositions of the examples are made with only the water insoluble alcohol(s).

In similar manner, although the described preferred monomers have been mentioned, the carboxyl-free monomers of the invention may be replaced by fumarate esters and itaconate esters, such as diethyl fumarate and dimethyl itaconate, acrylonitrile and n-vinyl pyrrolidone in the examples and the carboxyl-containing monomers or carboxyl-substituted monomers may be acrylic acid, methacrylic acid or other equivalent ethylenically unsaturated acids and the resins produced will be satisfactory.

The polymerization initiators of the examples given may be changed to other organic peroxides without detriment to the production of satisfactory resins. Such free radical generators include p-tolyloyl peroxide; t-butyl peroctoate; t-butyl perbenzoate, and azo-bis-isobutyronitrile may also be used.

The bases employed to solubilize the resins, as in Parts B of the examples, may be changed to sodium hydroxide solutions, potassium hydroxide solutions or amine-containing compounds, such as were described in the specification, and good water soluble products result. When the proportions of the various constituents are changed within the ranges given in the specification useful resins are also made.

Similarly, changes may be made in the formulas of the polishes of the preceding working examples by utilizing the different resins mentioned and other adjuvants described or by interchanging various components of the examples, employing the proportion ranges given in the specification. Products resulting make good coating compositions, especially floor polishes of light color, resistance to water spotting and easily removable with ammonia. Instead of being employed in floor polishes, the described resins may be utilized in printing inks, adhesives, paints, varnishes and various other coating compositions in replacement of conventional resins therein and in such applications are found to be especially good in promoting binding of the other components to surfaces to which they are applied.

The invention has been described with respect to specific examples and illustrations thereof but is not to be limited to these because it is evident that one of skill in the art, with the present specification before him will be able to utilize equivalents and substitutes, while still being within the concept and scope of the invention.

1. An aqueous base-soluble solid resin having an acid number of 120 to 185, which is the reaction product polymer of a reaction mix comprising about 20 to 70 mole percent of at least one carboxyl-free polymerizable ethylenically unsaturated monomer, about 15 to 60 mole percent of at least one carboxyl-substituted polymerizable ethylenically unsaturated monomer of the formula $CH_2=CR^2COOH$, wherein $R^2$ represents hydrogen or methyl, as a solvent for the reaction mixture, which is retained in the resin, a mixture of saturated alcohols of normal boiling points above about 175°C., which mixture contains about 30 to 60 weight percent of water insoluble liquid alcohol and about 40 to 70 weight percent of water soluble alcohol, the mole percentage of the solvent alcohols being about 10 to 20, and about 0.3 to 1 mole percent of an organic free radical-generating polymerization initiator, the number average molecular weight of the resin corresponding to about 600 to 4,000 at 10 mole percent content of solvent in the reaction mix, and the water insoluble alcohol having a boiling point above 175°C. being a source of such alcohol in the resin.

2. An aqueous base-soluble solid resin having an acid number of 120 to 185, which is a reaction product polymer of a reaction mix comprising about 20 to 70 mole percent of at least one carboxyl-free polymerizable ethylenically unsaturated monomer, about 15 to 60 mole percent of at least one carboxyl-substituted polymerizable ethylenically unsaturated monomer of the formula $CH_2=CR^2COOH$, wherein $R^2$ represents hydrogen or methyl, an effective polymerization initiating proportion of an organic free radical-generating polymerization initiator and, as a solvent for the reaction mixture, which is retained in the resin, about 5 to 10 mole percent of a water insoluble primary monohydric saturated aliphatic alcohol of 9 to 12 carbon atoms having a boiling point above 175°C., which solid resin has a number average molecular weight corresponding to about 600 to 4,000 at 10 mole percent content of such solvent alcohol in the reaction mix.

3. A resin according to claim 1 wherein the structural formula of the carboxyl-free monomer(s) is $CH_2=CR-Z$ wherein R represents hydrogen or methyl and Z represents a carboxy-lower alkoxy group or an aryl radical selected from the group consisting of phenyl and lower alkyl substituted phenyl, wherein the lower alkoxy and lower alkyl groups are of 1 to 4 carbon atoms with the proviso that when Z is aryl, R is hydrogen, and the alcohol(s) of the solvent is/are selected from the group consisting of monohydric alcohols, diols and triols.

4. A resin according to claim 3 wherein there is present as carboxyl-free monomers a mixture of compounds corresponding to the structural formula $CH_2=CR-Z$, in one of said compounds Z being aryl and in remaining compound(s) being carbo-lower alkoxy, the alcohols of the solvent are saturated aliphatic alcohols and have normal boiling points above about 205°C. and there is present in the reaction mixture about 0.3 to 0.9 mole percent of initiator selected from the group consisting of aroyl peroxides and lower akyl esters of aliphatic and/or aromatic carboxylic peracids.

5. A resin according to claim 4 wherein there is present as the carboxy-free monomers a mixture of styrene and a lower akyl acrylate or methacrylate in a molar ratio of about 1.6:1 to 3:1, the molar ratio of carboxyl-free monomers to carboxyl-substituted monomers being in the range of about 1.2:1 to 2.7:1, the solvent contains 40 to 55 weight percent of water insoluble alcohol(s) and about 45 to 60 weight percent of water soluble alcohol(s) and the initiator is an aroyl peroxide.

6. A resin according to claim 5 wherein there is present as the carboxyl-free monomers a mixture of styrene and methyl methacrylate, the carboxyl-substituted monomer is methacrylic acid, the solvent consists essentially of about 50 weight percent of a water soluble alcohol and about 50 weight percent of a water insoluble alcohol and the initiator is benzoyl peroxide.

7. A resin according to claim 6 wherein the water soluble alcohol of the solvent is a diol and the water insoluble alcohol is a primary monohydric aliphatic alcohol or mixture thereof of 9 to 12 carbon atoms.

8. A resin according to claim 7 wherein the molar ratio of styrene to methyl methacrylate is about 2:1, the molar ratio of carboxyl-free monomer(s) to carboxyl-substituted monomer(s) is about 1.5:1, the water soluble diol is 2,2,4-trimethyl-1,3-pentane diol, the water insoluble monohydric primary alkanol is n-decyl alcohol, the mole percent of benzoyl peroxide in the mixture being about 0.3 and the resulting resin having an acid number of 120 to 185 and a number average molecular weight of 900 to 2,500.

9. A resin according to claim 2 wherein there is present with the monohydric alcohol of 9 to 12 carbon atoms a water soluble alcohol having a boiling point above 175°C. and the weight percentages of water insoluble alcohol and water soluble alcohol are 30 to 60 and 70 to 40, respectively, in the mixture thereof.

* * * * *